Dec. 3, 1963    C. A. MAUNDER    3,112,694
METHOD OF MAKING SILK SCREEN STENCILS
Filed Feb. 14, 1961    3 Sheets-Sheet 1

Inventor
CLAUDE ALFRED MAUNDER
By Bacon & Thomas
Attorneys

Dec. 3, 1963  C. A. MAUNDER  3,112,694
METHOD OF MAKING SILK SCREEN STENCILS
Filed Feb. 14, 1961  3 Sheets-Sheet 2
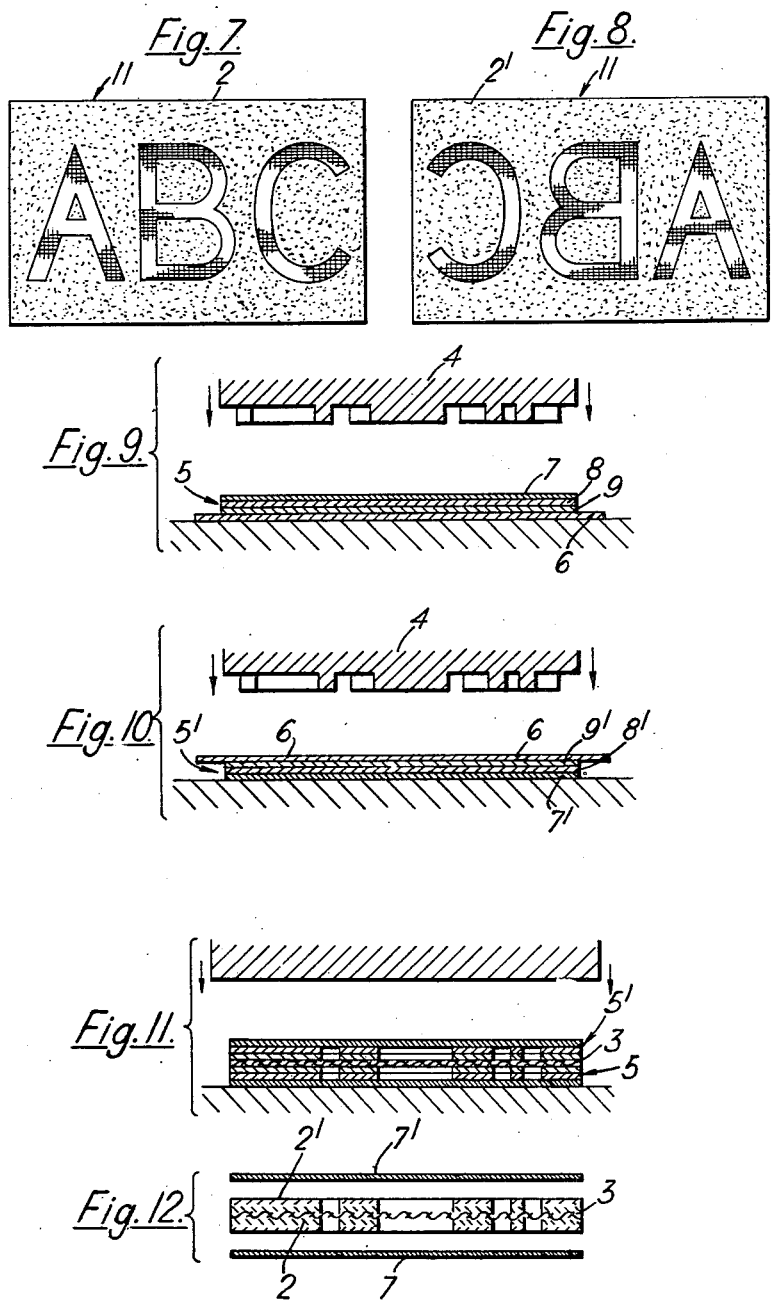
Inventor
CLAUDE ALFRED MAUNDER
By Bacon & Thomas
Attorneys Dec. 3, 1963 C. A. MAUNDER 3,112,694
METHOD OF MAKING SILK SCREEN STENCILS
Filed Feb. 14, 1961 3 Sheets-Sheet 3
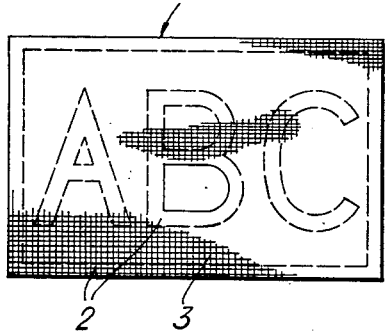
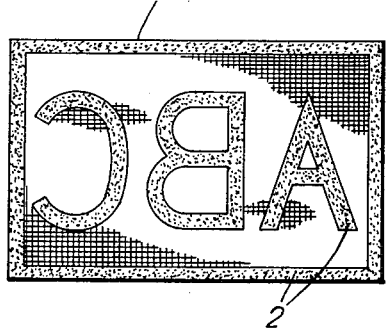
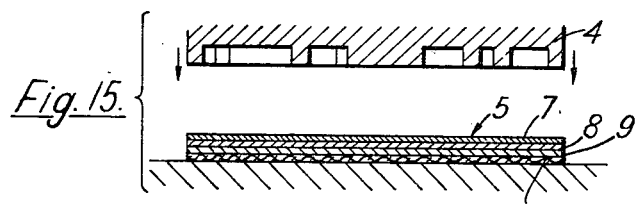
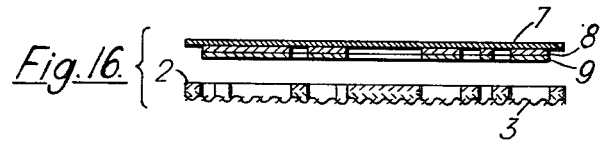
Inventor
CLAUDE ALFRED MAUNDER
By Bacon & Thomas
Attorneys 3,112,694
METHOD OF MAKING SILK SCREEN STENCILS
Claude Alfred Maunder, London, England, assignor to Masson Seeley and Company Limited, London, England, a British company
Filed Feb. 14, 1961, Ser. No. 89,163
Claims priority, application Great Britain June 24, 1960
3 Claims. (Cl. 101—128.2)

This invention relates to a method of making "silk screen" stencils. It is to be understood that the term silk screen as used in the art and in this specification includes screens woven from materials other than silk such as, for example, terylene.

Silk screen stencils are commonly used in industry for informatory marking of packages, crates, boxes and the like articles. Hitherto the methods employed to make stencils for such purpose have called for the use of skill and time to obtain satisfactory results. It is an object of this invention to provide a method of making such silk screen stencils which is simple, quick and requires no special skill to perform.

According to the present invention there is provided a method of making a silk screen stencil which comprises marking a silk screen from a suitable blocking foil directly or indirectly by means of a die of the desired mark, thereby to render the marked areas of said screen impermeable in use.

Suitable available blocking foils for use in carrying out this invention are those in which the transferable layer is coated with a film of a suitable thermoplastic material such as that known as "Geon" latex.

A blocking foil is a foil comprising a carrier or backing sheet coated with a thermoplastic layer, usually pigmented, which is transferable to the article to be marked under the action of heat and pressure.

For a positive mark on the article to be made, i.e. a mark which itself is coloured to contrast with the background, a negative stencil is required, i.e. a stencil in which the background is rendered impermeable. If the silk screen were to be marked directly to produce such a negative stencil, a negative die of comparatively large marking surface is required which effectively limits the size of mark which can be marked directly onto the silk screen since for practical purposes the applied force required of the press rapidly becomes inconveniently large with increasing size of mark.

Hence generally if a positive mark on the article is required, it is preferred to mark the screen indirectly by means of a positive die, the mark first being printed from said foil by means of said positive die and thereafter the remaining background area of the foil being transferred from said printed blocking foil onto the silk screen to form said negative stencil.

If, however, a negative mark on the article to be marked is required then much larger marks can conveniently be printed from the blocking foil directly onto the screen by means of a positive die since in general for the same mark the marking surface of the positive die will be much smaller than that of the corresponding negative die.

For the usual positive informatory marks required in industry the die will be composed of type which can be set up simply and quickly in known manner in a conventional marking press for blocking foils.

The printing of the blocking foil may either be through waste paper or through the blocking foil. In the latter case the mark as seen from the transferable layer side of the blocking foil will be reversed from left to right.

With either procedure the printed blocking foil is then placed transferable side against the silk screen and, again by the usual application of heat and pressure, the transferable layer of the printed foil is transferred to the silk screen to block out all except the areas previously printed from the foil, thus giving a negative stencil. According to whether the printing step was performed through the waste paper or foil or through the blocking foil so the marking liquid will have to be applied from the opposite side or the same side respectively of the screen as that to which the transferable layer of the blocking foil was applied.

Several examples of the invention will now be described with reference to the accompanying drawings, in which:

FIGS. 7 and 8 are front and rear views respectively of another form of silk screen stencil according to the invention;

FIGS. 9 to 12 are diagrammatic sectional views to an enlarged scale illustrating the steps in the making of the stencil of FIGS. 7 and 8;

FIGS. 13 and 14 are front and rear views respectively of yet another form of silk screen stencil according to the invention; and FIGS. 15 and 16 are diagrammatic sectional views to an enlarged scale illustrating the steps in the making of the stencil of FIGS. 13 and 14.

Figure 1:
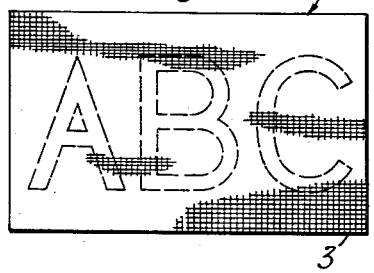
FIGS. 1 and 2 are front and rear views respectively of one form of silk screen stencil according to the invention.
Figure 2:
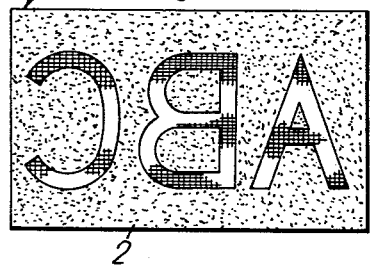

FIGS. 1 and 2 show a silk screen stencil 1 for making a positive mark "ABC" on an article in which material 2 from a blocking foil 5 has been transferred to the rear side only of the screen 3.

Figure 3:
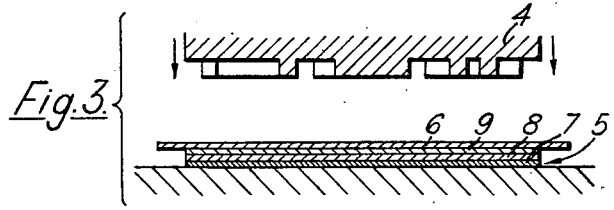
FIGS. 3 to 6 are diagrammatic sectional views to an enlarged scale illustrating the steps in the making of the stencil of FIGS. 1 and 2.
Figure 4:
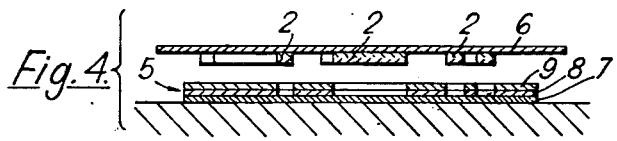

FIGS. 3 and 4 illustrate the first step in the making of the stencil of FIGS. 1 and 2, wherein a heated positive die 4 of the desired mark is used to print out the mark from a blocking foil 5 onto waste paper 6, the printing being effected through the waste paper. The blocking foil 5 comprises a carrier sheet 7, thermoplastic transferable pigmented layer 8 and a further clear thermoplastic coating 9 provided to ensure that the material 2 transferred to the screen, i.e. the layer 8 and coating 9, will render the screen impermeable in use. After transfer the layer 8 and coating 9 are indistinguishable and therefore are collectively designated by reference numeral 2. FIG. 4 shows material 2 printed onto the waste paper 6 from the foil 5.

Figure 5:
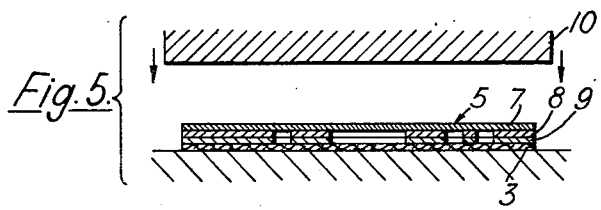
Figure 6:
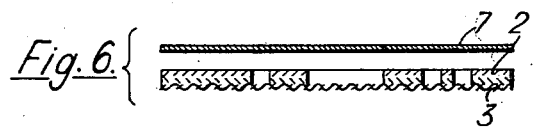

Next, as illustrated in FIGS. 5 and 6, the blocking foil 5 from which material has been printed onto the waste paper is placed with its transferable side against the silk screen 3 and by means of a heated plate 10 the remaining transferable material is transferred to the screen 3 and is embedded therein to render the areas thereof covered by transferred material 2 impermeable.

FIGS. 7 and 8 show a silk screen stencil 11, again for making a positive mark "ABC" on an article, in which material 2, 2' from printed blocking foils has been transferred to each side of the screen 3 to give a particularly durable stencil.

The method of making this stencil is similar to that for stencil 1 and therefore in FIGS. 9 to 12 like reference numerals have been used for like parts. For this stencil 11 it is necessary to print the mark from two blocking foils 5, 5', the foil 5' comprising a carrier sheet 7', a thermoplastic transferable pigmented layer 8' and a clear thermoplastic coating 9', one blocking foil being printed through the waste paper 6 and the other through the foil itself as illustrated in FIGS. 9 and 10 respectively so that the printed blocking foils 5, 5' are mirror images the one of the other and can therefore be arranged in register on opposite sides of the screen 3 for the material remaining thereon to be transferred to the screen. This last step is illustrated in FIGS. 11 and 12. Instead of transferring material from both printed foils 5, 5' to the screen 3 simultaneously as shown, material may be transferred from each foil separately.

The two printed blocking foils as used in the manner described above can easily and accurately be registered by eye on opposite sides of the silk screen.

FIGURES 13 and 14 show a positive silk screen stencil 12 for making a negative mark on an article, in which material 2 has been transferred to the rear side of the screen 3. In this case the material 2 on the screen forms the mark itself instead of constituting an outline for the latter as in the processes illustrated in FIGURES 1 to 12 of the drawings, and the border surrounding the mark which is to be applied to an article is delimited by a rectangular frame formed also of the material 2. In this process the step of printing the mark first on to a sheet of scrap paper or the like is dispensed with, the mark and the frame therefor being printed directly on to the rear surface of the screen by the application of the heated die 4 to the blocking foil 5 and screen 3, as shown in FIGURES 15 and 16.

It will be seen that the method of making silk screens described herein for use in industry to apply informatory marks to goods, crates, boxes and the like requires only the ability to set up type in a marking press and to operate such presses. This ability can be very speedily acquired as it requires no special skill.

It will be understood that for convenience of the user and in the making thereof blocking foils will be used whose transferable layers include a pigment although this is not essential to the working of silk screen stencils produced by the method according to the invention.

I claim:

1. A method of making a silk screen stencil having a design area and a background area and wherein one of said areas is defined by an impermeable solid thermoplastic film transferred from a carrier sheet of a blocking foil, comprising the steps of: dividing said film on said carrier sheet into portions corresponding respectively to said design area and said background area by means of a heated die having a flat face shaped to conform to said design area to transfer said design area from said blocking foil; adhering a selected one of said portions to one face of a permeable silk screen to render the corresponding one of said areas thereof impermeable; and discarding the other of said portions.

2. The method as defined in claim 1 wherein said die and said other portion conform to the area of said design and wherein said selected one portion is left on said carrier sheet of said blocking foil and thereafter transferred from said carrier sheet to said silk screen to render said background area impermeable thereby forming a negative stencil.

3. The method defined in claim 1 wherein said die conforms to said selected one portion and wherein said selected one portion is transferred from said blocking foil directly onto said silk screen, said other portion remaining on the blocking foil carrier sheet and being discarded therewith.

References Cited in the file of this patent

UNITED STATES PATENTS

| | | |
|---|---|---|
| 1,606,217 | Gestetner | Nov. 9, 1926 |
| 1,636,546 | Bates et al. | July 19, 1927 |
| 1,973,151 | Murphy | Sept. 11, 1934 |
| 2,034,437 | Kessel | Mar. 17, 1936 |
| 2,234,064 | Ulano et al. | Mar. 4, 1941 |
| 2,754,606 | Williams | July 17, 1956 |
| 2,757,608 | Schoech | Aug. 7, 1956 |
| 2,776,235 | Peck | Jan. 1, 1957 |